United States Patent [19]
Bailey

[11] 3,823,362
[45] July 9, 1974

[54] COORDINATED MASTER-SLAVE CONVERTER SYSTEM FOR VARIABLE-POWER TANK LOADS

[75] Inventor: Ronald B. Bailey, Waynesboro, Va.

[73] Assignee: General Electric Company, Philadelphia, Pa.

[22] Filed: Feb. 2, 1973

[21] Appl. No.: 328,894

[52] U.S. Cl. ........ 321/27 MS, 219/10.77, 321/45 C
[51] Int. Cl. ........................................... H02m 5/44
[58] Field of Search ........ 219/10.75, 10.77; 307/80, 307/82; 321/2, 5, 27 R, 27 MS, 45 C, 45 S; 323/25, 45

[56] References Cited
UNITED STATES PATENTS

| | | | |
|---|---|---|---|
| 3,521,150 | 7/1970 | Bates | 323/25 X |
| 3,600,668 | 8/1971 | Goldberg | 323/45 X |
| 3,631,332 | 12/1971 | Williamson | 321/45 S |
| 3,697,717 | 10/1972 | Kornrumpf et al. | 219/10.77 |

Primary Examiner—A. D. Pellinen
Attorney, Agent, or Firm—J. Wesley Haubner; Albert S. Richardson, Jr.

[57] ABSTRACT

A plural converter system, including parallel-connected current-source inverters, efficiently delivers alternating current to a tank load having variable power requirements. One of these inverters is a master and the remainder are slaves, and each has a maximum power rating and a loading range that is a fraction of the corresponding parameters of the load. The master inverter is started initially to charge the load, and the slaves are selectively controlled in response to the actual power requirement of the load so that the proper converters are running to supply the load demand without exceeding either the maximum unit rating or the limited range of any individual converter.

7 Claims, 1 Drawing Figure

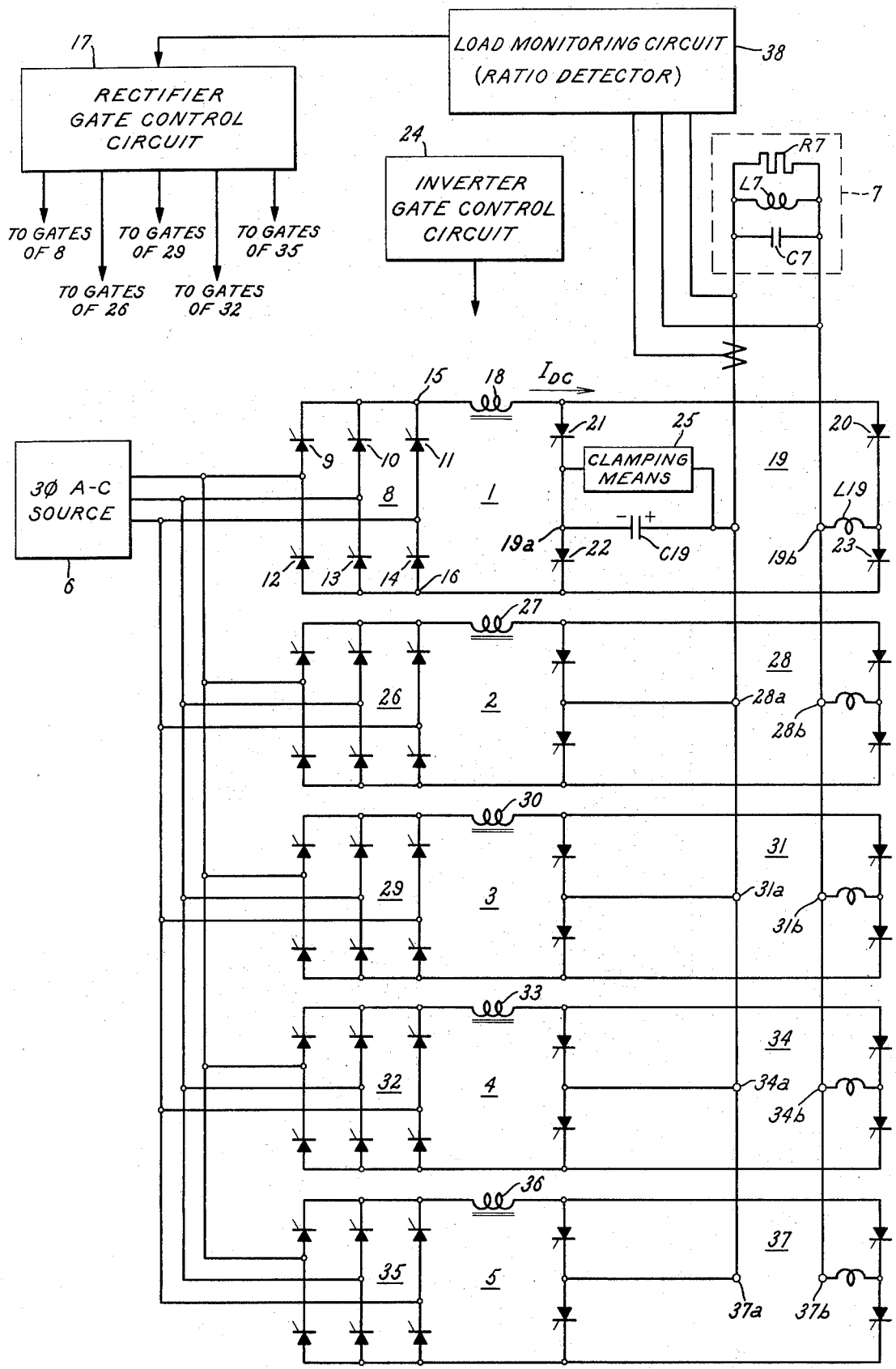

3,823,362

COORDINATED MASTER-SLAVE CONVERTER SYSTEM FOR VARIABLE-POWER TANK LOADS

BACKGROUND AND OBJECTIVES OF THE INVENTION

This invention relates generally to electric power conversion systems and more particularly to electric power delivery systems including plural current source inverters connected in parallel to supply alternating current to a high-power tank load.

The following art now known to applicant is indicative of prior art approaches in this area of technology: U.S. Pat. Nos. 3,599,078 (Pelley); 3,603,866 (Opal); and 3,668,509 (Riebs et al).

A "tank" load as used herein refers to a load circuit comprising the combination of resistance, inductance, and capacitance. One example is a parallel-tuned circuit formed by connecting a bank of capacitors across an induction heating coil.

With the commercial development of high-power solid-state controlled switching elements (often referred to as thyristors), there has been a growing interest in designing reliable and efficient static conversion apparatus employing such components for the purpose of supplying middle-frequency alternating current in industrial heating applications.

The basic concept is to use a power inverter in tandem with a power rectifier. The rectifier converts readily available three-phase alternating voltage at a fixed main frequency (e.g., 60 Hz.) into an undulating direct current. The unidirectional current thus provided is passed through a smoothing inductor or filter to reduce its ripple content. The filtered current is then supplied to a thyristor-composed inverter wherein load current carrying thyristors are cyclically triggered in a predetermined sequence and at a desired rate to change the direct current into a single-phase alternating current of controllable "middle" frequency (e.g., 100 to 4,000 Hz.).

Such apparatus may advantageously employ an inverter including a compensating capacitor connected in series with the tank load. Such an inverter will hereinafter be referred to as a series/parallel compensated inverter.

Series/parallel compensated inverters belong to the family of load-commutated inverters wherein the voltage developed across the load is utilized to effectuate commutation of the periodically conducting thyristors. As is known, such an inverter cannot be started "cold" from a non-operating state by simply triggering the respective thyristors at the desired steady-state rate, since initially the load is uncharged and has insufficient voltage to effectuate commutation until energized for a finite interval of time. The aforementioned Pelley patent discloses an auxiliary starting circuit for starting a current-fed parallel-compensated inverter. In my copending U.S. Pat. No. 3,725,770 assigned to the General Electric Company, there is shown and claimed means for effectuating turn-on of a thyristor-composed current-fed series/parallel compensated inverter without auxiliary power circuitry like that proposed by Pelley.

In a series/parallel compensated inverter fed from a current source including a polyphase rectifier and a smoothing inductor (choke), it is of considerable importance that the inductance of the choke be sufficiently high to ensure a continuous supply of direct current to the inverter. The worst case occurs where the connected load is actually dissipating appreciably less than rated power at rated voltage (such a condition being referred to as a light load). In such a case the average magnitude of current fed to the inverter is relatively low, and if the amplitude of its ripple is substantial, an undesirable discontinuous current condition can result. A choke that is sized to prevent the instantaneous magnitude of current from dropping as low as the critical level at which the inverter could malfunction under light load conditions will undesirably reduce converter efficiency at rated loads. This limits the loading range of a practical inverter and makes it unsuited for supplying a load circuit characterized by widely variable power utilization capacity (i.e., a load whose power consumption changes from time to time over a wide range between predetermined minimum and rated magnitudes of load current).

Accordingly, it is a general objective of my invention to increase the loading range of conversion apparatus for delivering electric power to a tank load having variable power utilization capacity.

It is a further objective of my invention to provide a novel arrangement of current-fed inverters for providing power to a load wherein relatively small smoothing inductors can be utilized.

It is yet a further object of my invention to provide an improved plural inverter system wherein other economies can be realized in its original construction and subsequent operation.

SUMMARY OF THE INVENTION

In carrying out my invention in one form, I provide a master electric power converter including a first current-fed inverter for supplying alternating current to a tank load of variable power utilization capacity. The first inverter is suitably arranged and controlled for cold starting, whereby the master converter effectuates initial charging of the load and continues to supply at least a certain minimum current under light load conditions. One or more additional, slave converters are provided, each including a current-fed inverter connected in parallel with the first inverter across the load. Monitoring and control means are provided for monitoring total load current and voltage and for rendering one of the slave converters operative if the amount of power actually required by the load approaches the maximum power rating of the master converter. The inverter of the slave converter runs in synchronism with the first inverter, and no special starting means is associated therewith. This system is well suited for high-power tank loads whose range of power variation exceeds the individual loading range of the separate converters. As many slave converters as desired can be provided for sharing the load under full load conditions. But only the master converter is equipped with starting means, and when running alone it can satisfy the the lightest load requirement with considerably higher efficiency than a single converter designed to accommodate the whole range of load variations.

BRIEF DESCRIPTION OF THE DRAWING

My invention will be better understood and its various objects and advantages will be more fully appreciated from the following description taken in conjunction with the accompanying drawing which is a schematic diagram of an electric power system embodying my invention.

DETAILED DESCRIPTION OF THE PREFERRED EMBODIMENT

As can be seen in the drawing, five electric converters 1, 2, 3, 4, and 5 are connected in parallel with one another between a 3-phase source 6 of alternating voltage and a single-phase tank load 7. The source voltage alternates at a predetermined main frequency, such as 60Hz. The tank load 7 comprises resistance R7 and inductance L7 (which may represent a ferromagnetic work piece in an induction heating coil) shunted by a capacitor bank C7, and this parallel combination is tuned for excitation by alternating current of desired frequency such as 1 KHz. In operation, the power utilization capacity of the illustrated load is assumed to be variable over a wide range between predetermined minimum and rated magnitudes of load current. Load variations can occur for a variety of reasons known to persons skilled in the art of induction heating. For example, the load circuit 7 may be designed to utilize various heating coils which are changed from time to time to accommodate different kinds of work pieces having widely different load characteristics. As will soon be more fully appreciated, my versatile system will supply the requisite power to the connected load with relatively high efficiency regardless of whether the amount of power that the load is consuming is at the high or low end of its range of possible variation.

The converters comprising the power system illustrated in the drawing are adapted to change the three-phase 60 Hz. A-C source voltage into single-phase higher frequency alternating current which is supplied to the tank load 7. Each of these converters includes a phase-controlled rectifier circuit for rectifying the three-phase alternating voltage to provide direct current which will have some ripple content, a current smoothing inductor to minimize the ripple of the rectified current, and a current-source inverter which is supplied with the smoothed direct current and which in turn supplies alternating current to the load. Converter 1 is hereinafter referred to as the master-converter, and converters 2 through 5 are hereinafter referred to as slave converters. Each of the converters has a predetermined maximum power rating at which it may safely operate. Coordination of the master and the slave converters will be discussed later.

The master converter 1 includes a three-phase full-wave rectifier 8 comprising six thyristors (SCR's) 9, 10, 11, 12, 13, and 14 which are arranged to form a six-pulse bridge circuit having a set of three a-c terminals connected to the source 6 and a pair of d-c terminals 15 and 16. The average magnitude of the undulating unipolarity voltage between the terminals 15 and 16 can be varied from maximum to minimum by suitably controlling the "firing angle" of a family of trigger signals which are periodically applied to the gates of the respective thyristors 9-14 in synchronism with the 60 Hz. A-C source. To that end a control circuit 17 is provided. The output of the rectifier 8 includes a 360 Hz. ripple whose amplitude increases with firing angle (i.e., it becomes more pronounced as the firing angle is increased to lower the average magnitude of the output voltage). A smoothing inductor or choke 18 is coupled to the d-c terminal 15 of the rectifier 8 to reduce the ripple in the output current so as to provide a smoother direct current, denoted as $I_{DC}$. To maintain continuous current in the choke 18, the rectifier output voltage is never reduced below a predetermined minimum average magnitude (e.g., 10 percent of maximum). The relatively constant current $I_{DC}$ is fed to the input terminals of an associated load-commutated inverter 19.

The inverter 19 is a series/parallel compensated inverter like that described in my above-cited copending patent. As is known, such an inverter is formed by appropriately interconnecting and cyclically triggering in a prescribed sequence a plurality of main switching elements (e.g., thyristors or SCR's). Inverter 19 is seen to comprise four thyristors 20, 21, 22 and 23. The inverter input terminals are spanned by thyristor 20 in series with thyristor 23 and also by thyristor 21 in series with 22. A pair of output terminals 19a and 19b, which comprise the respective junctures of thyristors 21 and 22 and of thyristors 20 and 23, are connected to a subcircuit formed of a series compensating capacitor C19 and the load 7. The odd-numbered thyristors 21 and 23 when conductive form a first main current path which supplies $I_{DC}$ to the load 7 in one direction, and the even-numbered thyristors 20 and 22 when conductive form a second main current path which supplies $I_{DC}$ to the same load but in the opposite direction. By alternately triggering the odd and even numbered thyristors, the current $I_{DC}$ will be made to cyclically change directions through the load 7 at a frequency determined by the triggering rate of these thyristors. Suitable inductance L19 is included in the inverter bridge to limit the rate of change of current when commutating from the odd pair of thyristors to the even pair and vice versa. With a nearly square wave of current being switched into the tank load, an alternating voltage of sinusoidal waveform is developed thereacross.

The triggering rate or frequency at which the thyristors of the inverter 19 are fired is established by an inverter gate control circuit 24. When in a "running" mode of operation, the control circuit 24 provides a first train of short-duration pulses at a desired repetition rate (e.g., 1,000 Hz.) for triggering the thyristors 21 and 23 and a second train of short-duration pulses for triggering the thyristors 20 and 22. The pulses in the second train are displaced in time with respect to the pulses in the first train by one-half of the interval between consecutive pulses of the first train. These two pulse trains may be conveniently provided in response to alternative outputs of a flip-flop circuit (not shown) which is made to change states at a frequency twice that of the desired operating frequency.

As previously noted, series/parallel compensated, load-commutated inverters cannot be started "cold" due to the absence of sufficient load voltage to commutate current from one main path to the other to produce the desired alternating current output. In my above-cited copending patent I have disclosed and claimed a novel and efficient technique for starting a series/parallel compensated inverter. The master inverter disclosed herein can be advantageously started by that technique. To that end rectifier gate control circuit 17 is suitably arranged to start applying trigger signals, at a delayed firing angle (reduced voltage), to the thyristors of the rectifier 8 in response to an "ON" command given at a time when the converter is in its non-operating or "OFF" state. At the same time, the inverter gate control circuit 24 responds to the "ON" command by initially applying long gate signals simultaneously to thyristors 20 and 22 of the inverter 19, whereby direct current ($I_{DC}$) begins flowing through a path including thyristor 20, load 7, compensating capacitor C19 and thyristor 22. This action enables $I_{DC}$ to charge the series compensating capacitor C19. As soon as the capacitor C19 is charged to a predetermined voltage of the polarity shown, the inverter gate control circuit applies gate signals simultaneously to both thyristor 21 and thyristor 22, whereupon $I_{DC}$ transfers from thyristor 20 to 21 and increases in magnitude while the compensating capacitor C19 remains charged as shown. When the magnitude of $I_{DC}$ reaches a predetermined level, the inverter gate control circuit 24 begins applying gate pulses alternately to the odd and even numbered thyristors of the inverter 19, starting with the odd numbered ones, and alternating current is now supplied to the load as previously described. The voltage appearing on the precharged capacitor C19 effectuates commutation in the inverter 19 until the tank load is charged sufficiently to effectuate commutation on its own.

After the tank load 7 is initially charged and its voltage has attained a predetermined magnitude (sufficient to effectuate commutation), the voltage on the compensating capacitor is clamped at a very low magnitude by clamping means 25. Clamping means 25 is constructed and arranged in accordance with the teachings of my copending U.S. Pat. No. 3,757,197 assigned to the General Electric Co. Its activation marks the end of the starting interval, and the inverter control circuit 24 thereafter is set in its running mode. Additional means (not shown) is preferably provided to control the frequency of the alternate pulse trains issued by the circuit 24 in accordance with the teachings of my prior U.S. Pat. No. 3,718,852 and assigned to the General Electric Co. The master converter is capable of efficiently supplying the load with current of at least a predetermined minimum "light load" magnitude at rated load voltage. In steady state or running operation, a conventional voltage regulator associated with the rectifier gate control circuit 17 will vary the firing angle of the rectifier trigger signals as necessary to bring the amplitude of load voltage or, alternatively, the amount of electric power delivered to the load 7 into agreement with a preset or programed reference.

All of the slave converters 2, 3, 4 and 5 are duplicates of one another and are similar in construction to the master converter 1, with the exception that there are no starting means and series compensating capacitors associated with the slaves. As can be seen, slave converter 2 includes a phase-controlled, six-pulse rectifier circuit 26, a current smoothing inductor 27, and a current-fed, load-commutated inverter 28 having input terminals connected via the inductor 27 to the d-c terminals of the rectifier 26 and having a pair of output terminals 28a and 28b. In a similar manner converter 3 includes a rectifier circuit 29, a smoothing inductor 30, and a parallel-compensated, current-fed inverter 31 having a pair of output terminals 31a and 31b. Slave converter 4 includes a rectifier 32, a smoothing inductor 33, and a current-fed, load-commutated inverter 34 having output terminals 34a and 34b. Slave converter 5 similarly includes a rectifier 35, an inductor 36, and an inverter 37 having output terminals 37a and 37b.

The inverters 19, 28, 31, 34, and 37 of the master and the slave converters are connected in parallel with one another across the load 7 as shown. Their respective thyristors are all triggered synchronously by the inverter gate control circuit 24. That is, the first train of pulses issued by the circuit 24 when in its running mode is used not only for triggering the odd-numbered pair of thyristors 21 and 23 in the first inverter 19, but also for simultaneously triggering the corresponding pairs of thyristors in the inverters of the slave converters, and the second train comprises appropriate gate pulses for simultaneously triggering the even-numbered pair of thyristors 20 and 22 and all corresponding pairs of thyristors in the other inverters.

The a-c terminals of all five rectifier circuits 8, 26, 29, 32, and 35 are adapted to be connected to the common 3-phase A-C source 6. The rectifier gate control circuit 17 provides separate families of trigger signals for the thyristors forming the rectifier circuits of slave converters 2 through 5, respectively. However, the circuit 17 includes means (not shown) for normally inhibiting the passage of these signals until operation of selected slave converters is desired, as will soon be more fully explained. Each slave converter, once rendered operative by the presence of its family of rectifier trigger signals, has the ability to supply a portion of the total load current in parallel with the master converter.

The maximum power rating of each of the slave converters preferably is the same as that of the master converter. Consequently the system shown in the drawing is capable of providing power to a tank load having a rated full-load power utilization capacity equal to five times the unit rating of the individual converters. Furthermore, the system can efficiently deliver power over a wide range of load variations without exercising any individual converter over more than a relatively limited loading range.

In accordance with one aspect of my invention, the master converter 1 is rendered operative first to supply the initial increment of current to the tank load and to effectuate the charging thereof. Thereafter, one or more of the slave converters are selectively rendered operative to supply additional current to the load. The number of slave inverters rendered operative is dependent upon the actual power requirements of the load.

As can be seen in the drawing, a load monitoring circuit or ratio detector 38 is coupled to the load. The load monitoring circuit is operative for monitoring the total magnitude of current flowing through the load, monitoring the voltage appearing thereacross, and providing a signal indicative of the ratio of load current, in percent of rated load current (full load), to load voltage, in percent of rated load voltage. The per unit load signal produced by the monitoring circuit 38 is coupled to the rectifier gate control circuit 17, and the circuit 17 includes means responsive to this signal for enabling rectifier trigger signals to be applied to selected slave converters.

Whenever the signal produced by the circuit 38 indicates that the above-mentioned ratio is no higher than 0.2, the rectifier gate control circuit 17 effectively inhibits or suppresses the trigger signals for the rectifier circuits of all of the slave converters 2, 3, 4, and 5, and in this case only the master converter is operative to supply current to the load 7. If the ratio were higher than 0.2, in a range up to 0.4 (which range indicates that the actual power requirement of the load is then greater than the maximum power rating of the master converter but not more than twice that rating), the rectifier gate control circuit 17 responds to the resulting per unit load indicating signal by releasing or passing the family of trigger signals to the gates of the rectifier circuit 26 in the first slave converter 2, thereby rendering this slave converter operative and, as a result, causing both the master and the first slave inverter to supply alternating current in equal proportions to the load 7, while continuing to block operation of the other three slave converters. Whenever the indicated ratio is higher than 0.4, in a range up to 0.6 (true when the actual power requirement of the load is greater than the aggregate of the maximum power ratings of the master and first slave converters but not greater than the aggregate ratings of the master and two slaves), the control circuit 17 concurrently passes rectifier trigger signals to the rectifier circuit 29 in the second slave converter 3 and to the rectifier circuit 26 in the first slave converter 2, and both of these slaves are therefore operative to supply, in conjunction with the master converter 1, alternating current to the load. When the indicated ratio is higher than 0.6 but not higher than 0.8, the control circuit 17 passes trigger signals to the gates of the respective rectifier circuits of the first three slave converters 2, 3, and 4 which are thereby rendered operative to supply current in parallel with the master converter 1 to the load 7. When the ratio is higher than 0.8, none of the rectifier trigger signals are suppressed or inhibited, and all four slave converters are operative.

By coordinating a plural converter system in the manner just described, only the minimum number of slave converters that will satisfy the actual power requirements of the connected load are operated at any given time. For reasons that will now be reviewed, this reduces the cost and increases the efficiency of the system compared to supplying the same variable load from a single, larger converter.

A converter should be designed for operation as close as possible to its maximum power rating and with as small an excursion between minimum and maximum power outputs as possible. If the converter has to operate at less than approximately 50 percent of its rated output, the amplitude of the ripple in the rectifier output voltage becomes so great that the size and cost of the smoothing inductor required to maintain continuous current into the inverter becomes undesirably large. In any application where the expectable range of power variations of a high-power tank load exceeds 2:1, economy can be improved by practicing my invention. The disclosed embodiment is well suited for a load whose power utilization capacity varies as widely as 10:1. To illustrate the advantages of my system, assume that the tank load 7 is consuming only 40 percent of its rated full-load power at rated voltage. The load monitoring circuit 38 will then produce a signal indicating that the ratio of load current to load voltage is 0.4, and the rectifier gate control circuit 17 will respond by rendering operative only the master and one slave converter. Consequently both of these converters will be efficiently operating at their maximum power ratings, even though the amount of power required by the load is only 40 percent of rating. If the load were to further decrease to nearly 20 percent of rating, both converters 1 and 2 would continue to share the reduced load but each would still be operating at approximately 50 percent of its rated output. Even if the load requirement were to drop to 10 percent of rated full-load power, the master converter alone could continue to satisfy this requirement without operating at less than 50 percent of its maximum rating. It will now be apparent that the illustrated system is capable of supplying electric power to a tank load whose power utilization capacity may vary over a range as wide as 10:1 while the loading range of the constituent converters is limited to 2:1 or less, thereby ensuring that in each converter the magnitude of the direct current fed to each operating inverter is always sufficiently high to preclude its malfunction without necessitating large and expensive smoothing inductors.

Only one slave converter need be provided if the range of load variation is no greater than 4:1. Two slaves are desirable if the range is 6:1, and three slaves are desirable if the range is 8:1. In each case the power requirements of the connected load are assumed to be supplied in equal shares by the master converter and all of the slave converters which are operative. It will be observed that both the maximum rating and the loading range of the master converter are related to the maximum power utilized by the load and to the range of load power variations by a fraction 1/N, where N is the number of converters in the system. The loading range of the first slave converter is the same as the master, and the loading range of each additional slave is even less. No special starting circuitry is contemplated for any of the slave converters. While the particular means described hereinbefore for starting the master converter is presently preferred, it could be replaced if desired by alternative starting schemes known in the art.

To aid in understanding my invention, I will next describe an example of its operation when starting into a light load that requires only 30 percent of full-load power. In response to the ON command, rectifier gate control circuit 17 immediately applies a family of trigger signals to the gates of the thyristors forming the rectifier circuit 8 of the master converter only. At the same time, the inverter gate control circuit 24 begins its starting sequence of firing the thyristors which form the inverter 19, whereupon $I_{DC}$ begins flowing through the choke 18. By the conclusion of the starting interval, the tank load is charged, the clamping means 25 is activated, and the inverter gate control circuit 24 is issuing trains of alternate pulses for running the inverter 19 at a desired frequency which is determined by the angle regulator (see my prior U.S. Pat. No. 3,718,852). The same pulse trains are supplied to the inverters 28, 31, 34, and 37 of the slave converters, but so long as the rectifiers 26, 29, 32, and 35 do not receive trigger signals and hence are turned off, no current is fed to the input terminals of these inverters and the slave converters 2–5 remain inoperative. The aforesaid angle regulator appropriately varies the frequency of the converter output current so that the load circuit exhibits a substantially constant leading power factor, and consequently the converter has a nearly constant voltage gain. The trigger signals at first applied to the rectifier circuit 8 were characterized by a delayed firing angle such that reduced voltage initially appears across the d-c terminals 15 and 16, and load voltage is therefore below its rated magnitude. Soon the voltage regulator takes over and advances the firing angle so as to increase the average magnitude of the rectified voltage, thereby proportionately increasing the current that the master converter supplies to the connected load.

Both the load current and the load voltage are monitored by the circuit 38 and the ratio of these quantities is determined on a per unit basis. It will be assumed in this example that at the time the controls responsive to the ratio indicating signal are first effective the magnitude of load voltage is 20 percent of rated voltage. The load current at this time is one-fifth of the light load requirement, or 6 percent of rated full load current. The ratio of 6 to 20 percent is 0.3. Consequently the ratio indicating signal causes the rectifier gate control circuit 17 to release the trigger signals for the rectifier circuit 26 in the first slave converter 2 which is thereby rendered operative in synchronism with the master converter. No special starting technique is used or needed for the load-commutated inverter 28 of the slave converter because the load is already charged when this inverter first comes on the line. It will now supply one-half of the total load current previously supplied by the master converter alone. There is no stepped increase of load voltage, and the per unit ratio of load current to load voltage remains at 0.3. The regulator systematically advances the firing angle of the rectifier trigger signals until the preset level of load voltage is attained, whereupon each of the operative converters 1 and 2 is able to supply about 75 percent of its maximum current rating at rated load voltage.

Starting under full load conditions is similar except that when the magnitude of load voltage has increased to 20 percent of rated voltage the current supplied to such a load is then 20 percent of its full-load magnitude and consequently the signal produced by the monitor 38 indicates a per unit current to voltage ratio of 1.0. This ratio indicating signal causes the rectifier gate control circuit 17 to pass rectifier trigger signals to all four slave converters which are rendered operative thereby.

While I have shown and described a particular embodiment of my invention, it will be obvious to persons skilled in the art that various changes and modifications may be made without departing from my invention in its broader aspects, and I intend herein to cover all such changes and modifications as fall within the true spirit and scope of my invention.

What I claim as new and desire to secure by Letters Patent of the United States is:

1. An electric power system for supplying alternating current to a tank load having variable power utilization capacity between predetermined minimum and rated magnitudes of load current, comprising:
   a. a master electric converter having a predetermined maximum power rating at which it may safely operate and including
      i. a first rectifier circuit having a-c and d-c terminals, said a-c terminals being adapted to be connected to a source of alternating voltage of predetermined main frequency,
      ii. a first current smoothing inductor, and
      iii. a first current-source, load-commutated inverter having input terminals connected via said first inductor to the d-c terminals of said first rectifier circuit and having a pair of output terminals connected to a subcircuit formed of a series compensating capacitor and the load, said first inverter being operative to supply the load with current of at least said minimum magnitude;
   b. a slave electric converter having a predetermined maximum power rating at which it may safely operate and including,
      i. a second rectifier circuit having a-c terminals adapted to be connected to said alternating voltage source and having d-c terminals,
      ii. a second current smoothing inductor, and
      iii. a second current-source, load-commutated inverter having input terminals connected via said second inductor to the d-c terminals of said second rectifier circuit and having a pair of output terminals connected across the load, said second inverter having the ability when said slave converter is operative to supply a portion of the total load current in parallel with that supplied by said first inverter;
   c. means for starting said first inverter to effectuate initial charging of the tank load and for running all of said inverters at a desired operating frequency; and
   d. control means for rendering said slave converter operative after the first inverter has been started only if the actual power requirement of the load is then greater than said power rating of said master converter, in which event both the first and the second inverters supply proportional shares of alternating current to the load.

2. The system of claim 1 wherein said control means comprises means for monitoring the magnitudes of the total current supplied to the load and the voltage across the load and for causing said slave converter to become operative in response to a predetermined range of ratios of load current, in percent of rated load current, to load voltage, in percent of rated load voltage.

3. The system of claim 1 additionally comprising:
   e. an additional slave electric converter having a predetermined maximum power rating at which it may safely operate and including:
      i. a third rectifier circuit having a-c terminals adapted to be connected to said alternating voltage source and having d-c terminals
      ii. a third current smoothing inductor, and
      iii. a third current-source, load-commutated inverter having input terminals connected via said third inductor to the d-c terminals of said third rectifier circuit and having a pair of output terminals connected across the load, said additional slave converter being rendered operative by said control means only if the actual power requirement of the load is greater than the aggregate of the power ratings of the master and first-mentioned slave converters after said first inverter has been started, whereupon the first, second, and third inverters all supply alternating current to the load.

4. The system of claim 3 wherein said control means comprises means for monitoring the magnitudes of the total load current and the load voltage and means for causing said first-mentioned slave converter to become operative in response to a first predetermined range of ratios of load current, in percent of rated load current, to load voltage, in percent of rated load voltage, and for causing both of said slave converters to become operative if such ratio is within a second predetermined range.

5. The system of claim 4 wherein both of said slave converters are concurrently rendered operative if said ratio is within said second range.

6. The system of claim 1 wherein each of said first and second rectifier circuits comprises a plurality of periodically triggered thyristors which are interconnected and arranged to form a phase-controlled full-wave rectifier circuit, and wherein said control means is effective to inhibit the triggering of the thyristors forming said second rectifier circuit except when said slave converter is rendered operative in response to the actual power requirement of the load being greater than said power rating of said master converter.

7. The system of claim 1 additionally comprising a compensating capacitor, means for connecting the output terminals of said first inverter in series with said compensating capacitor across the load, and means for connecting the output terminals of said second inverter directly across the load.

* * * * *